US010752086B2

(12) United States Patent
Srivastava et al.

(10) Patent No.: US 10,752,086 B2
(45) Date of Patent: Aug. 25, 2020

(54) HVAC INTAKE CONTROL BASED ON CONDENSER FRONT TEMPERATURE

(71) Applicant: TOYOTA MOTOR ENGINEERING & MANUFACTURING NORTH AMERICA, INC., Plano, TX (US)

(72) Inventors: Abhishek Srivastava, Ann Arbor, MI (US); David W. Cosgrove, Milford, MI (US); Hidekazu Hirabayashi, Ann Arbor, MI (US); Akiyoshi B. Maeda, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 52 days.

(21) Appl. No.: 16/248,501

(22) Filed: Jan. 15, 2019

(65) Prior Publication Data

US 2020/0223286 A1 Jul. 16, 2020

(51) Int. Cl.
*G05D 23/00* (2006.01)
*B60H 1/00* (2006.01)
*B60H 1/32* (2006.01)

(52) U.S. Cl.
CPC ..... *B60H 1/00849* (2013.01); *B60H 1/00807* (2013.01); *B60H 1/3208* (2013.01); *B60H 2001/3258* (2013.01)

(58) Field of Classification Search
CPC .......... B60H 1/00849; B60H 1/000807; B60H 1/3208; B60H 2001/3258

USPC ........................................................ 165/288
See application file for complete search history.

(56) References Cited

U.S. PATENT DOCUMENTS

| 5,413,875 A | * | 5/1995 | Tanaka | B32B 15/015 384/912 |
| 5,632,156 A | * | 5/1997 | Takeo | B60H 1/3205 62/160 |
| 6,077,158 A | * | 6/2000 | Lake | B60H 1/00278 454/70 |
| 6,094,930 A | * | 8/2000 | Zeng | B60H 1/00907 236/92 B |
| 7,362,060 B2 | | 4/2008 | Tembreull | |
| 8,239,095 B2 | | 8/2012 | Kikuchi | |
| 9,102,213 B2 | | 8/2015 | Motegi | |
| 9,452,661 B2 | | 9/2016 | Eisenhour | |

* cited by examiner

*Primary Examiner* — Davis D Hwu
(74) *Attorney, Agent, or Firm* — Sheppard, Mullin, Richter & Hampton LLP; Hector A. Agdeppa; Daniel N. Yannuzzi

(57) ABSTRACT

Methods and systems for controlling a heating, ventilation, and air-conditioning (HVAC) intake. An air-conditioning control device receives the detected ambient air from an ambient air sensor, and the detected air temperature at a front of a condenser. The two temperatures are compared to determine whether to change the HVAC intake. In response to determining the air temperature at the front of the condenser is higher than the ambient air, the HVAC intake is placed into a recirculate position to allow air from the vehicle compartment to enter the HVAC intake.

20 Claims, 6 Drawing Sheets

HVAC INTAKE CONTROL BASED ON CONDENSER FRONT TEMPERATURE

TECHNICAL FIELD

The present disclosure relates generally to automobile heating, ventilation, and air conditioning (HVAC), and more particularly to controlling air circulation modes based on operating conditions of the vehicle to optimize fuel economy and lessen the vehicle's operating load.

DESCRIPTION OF RELATED ART

Vehicles such as automobiles, may comprise, in part, an air-conditioning system. The air-conditioning system may include one or more ducts for feeding air to a vehicle cabin, a blower in the duct(s) for generating airflow towards the vehicle cabin, and a cooling device for cooling air passing through the duct(s). The air-conditioning system of the vehicle may also include a heater core, an air mix damper, a water valve, and a control device for controlling the aforementioned components of the air-conditioning system.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
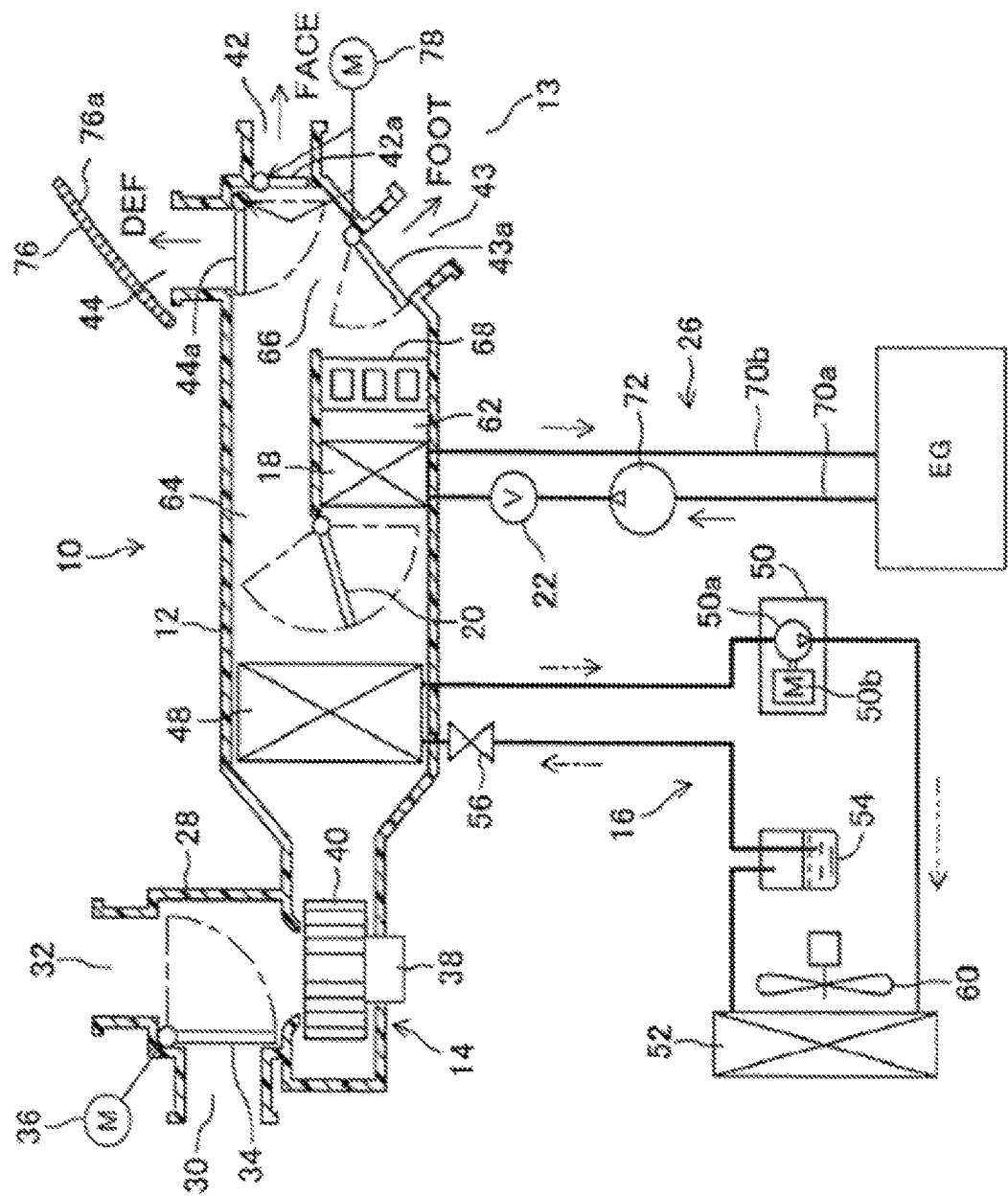
FIG. 1A is a schematic diagram of an example air-conditioning system in accordance with embodiments of the technology disclosed herein.

The figures are not exhaustive and do not limit the present disclosure to the precise form disclosed.

DETAILED DESCRIPTION

Various embodiments of the present disclosure are directed to controlling the air circulation mode of a vehicle's heating, ventilation, and air-conditioning (HVAC) system. Conventional HVAC intake logic utilizes ambient temperature to help determine what the HVAC intake should be (i.e., recirculated air or outside air). Ambient temperature sensors measure the external temperature outside of the vehicle. Awareness of external temperature enables the HVAC system to control whether the HVAC intake should take in fresh air or switch to taking in recirculated air from the cabin (which has already been treated through the HVAC system). However, this conventional HVAC intake logic fails to account for situations where the air conditioning compressor load is high, reducing fuel economy.

Embodiments of the technology disclosed herein provide an HVAC intake control method and system to optimize the determination of HVAC intake position. In addition to relying on ambient temperature, the HVAC intake control discussed herein senses the temperature at the front of the condenser and uses this temperature to determine whether to use fresh outside air or enter a recirculation mode. In some scenarios, although the ambient air temperature may be low, the temperature at the front of the condenser may be higher. The higher temperature at the condenser indicates that the air compressor load is heavy. This higher load increases the duty on the condenser fan, reducing fuel economy. Rather than allowing the ambient air to flow in through the HVAC intake like the conventional logic, the disclosed HVAC intake control can identify a high load on the compressor and instead use recirculated air, which has already been treated through the air conditioning system and reduces the load on the compressor.

An air-conditioning system in accordance with various embodiments may condition and/or feed air into a vehicle cabin. An air-conditioning control device (which can be a separate control device or implemented as part of a vehicle's engine control unit (ECU)) controls the air-conditioning system. In accordance with various embodiments, the air-conditioning control device may receive from one or more vehicle sensors to determine the operating conditions of the vehicle. The one or more vehicle sensors may determine, e.g., climate settings of the vehicle, whether the vehicle is in a tow mode, etc. Based on the sensed operating conditions (and the temperature at the front of the condenser), the air-conditioning control device may determine whether the HVAC intake should be positioned to intake interior air (recirculated air), exterior air (air outside the vehicle cabin), or a mixture of both to optimize air compressor load.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1A is a schematic diagram of an example air-conditioning system 10 according to an embodiment of the present disclosure. The air-conditioning system 10 may include a duct 12 for feeding air to a vehicle cabin 13, a blower 14 disposed in the duct 12 for generating airflow toward the vehicle cabin 13, and a cooling device 16 for cooling air passing through the duct 12. Further, the air-conditioning system 10 may include a heater core 18, an air-mix damper 20, a water valve 22, and an air-conditioning control device 24 (shown in FIG. 1B). The air-conditioning control device 24 may be configured to control blower 14, cooling device 16, air-mix damper 20, water valve 22, and the like, as described in greater detail below.

The heater core 18 may be implemented in duct 12 on a downstream side of the airflow with respect to an evaporator 48 of cooling device 16, and is configured to use an engine coolant supplied by a coolant circulation system 26. The engine coolant may be used as a heat source for heating air passing through duct 12 into vehicle cabin 13. The air-mix damper 20 may be implemented on an upstream side of the airflow with respect to the heater core 18 in duct 12. Air-mix damper 20 may be configured to change a ratio between an amount of air passing through the heater core 18 and an amount of air bypassing the heater core 18 by changing the degree to which air-mix damper 20 is opened.

Water valve 22 is provided in coolant circulation system 26 on an upstream side with respect to heater core 18 in terms of coolant flow (indicated by the solid arrows in FIG. 1A). Water valve 22 may be configured to decrease the amount by which it is opened depending on necessity, thereby decreasing the amount of coolant supplied to the heater core 18, or even stopping the flow of coolant.

Duct 12 includes a HVAC intake box 28 on an upstream side of the airflow with respect to blower 14 for switching the air to be introduced into duct 12. The air to be introduced may be interior air (air in the vehicle cabin 13, also referred to as recirculated air) and exterior air (air outside the vehicle cabin 13). An interior air opening 30 for introducing interior air into duct 12, and an exterior air opening 32 for introducing exterior air into duct 12 are provided for HVAC intake box 28. Furthermore, a HVAC intake door 34 may be arranged inside the HVAC intake box 28. HVAC intake door 34 may be used to adjust (e.g., continuously) interior air opening 30 and exterior air opening 32 simultaneously. Doing this can change an exterior air introduction ratio, which is a ratio of the exterior air to the entirety of air to be introduced into duct 12 from interior air opening 30 and the exterior air opening 32. HVAC intake door 34 may be driven by an electric actuator 36. The electric actuator 36 may be controlled by air-conditioning control device 24.

A mode of introducing interior/exterior air by way of HVAC intake box 28 is also referred to as inlet opening mode. The inlet opening mode includes an interior air mode (recirculate), an exterior air mode (fresh), and a semi-interior air mode (air-mix mode). In the interior air mode, when interior air opening 30 is fully opened, the exterior air opening 32 is fully closed, interior or recirculated air may be introduced into duct 12. In the exterior air mode, when the interior air opening 30 is fully closed, and the exterior air opening 32 is fully opened, exterior or fresh air may be introduced into duct 12. In the semi-interior air mode, the amount by which interior air opening 30 and exterior air opening 32 are opened may be approximately the same. In this way, exterior air and interior air may be introduced into duct 12 in equal or similar amounts.

Blower 14 can be an electric air delivery device that includes a blower motor 38 and a centrifugal multi-wing fan (sirocco fan) 40 driven by the blower motor 38. Blower 14 may be configured to blow air-conditioned air whose temperature is adjusted using air outlet openings 42 to 44 into vehicle cabin 13 and formed on duct 12. A rotational speed, which corresponds to the amount of air output by blower motor 38, is controlled by air-conditioning control device 24.

The cooling device 16 includes, for example, an evaporator 48, a compressor 50, a condenser 52, a gas-liquid separator 54, and an expansion valve 56. The evaporator 48 is arranged on a downstream side of the airflow with respect to the blower 14. The evaporator 48 is configured to evaporate a refrigerant, which has been expanded by expansion valve 56 after compression by the compressor 50. Evaporator 48 further performs a heat exchange between the refrigerant (decreased in temperature by evaporation) and air passing through the evaporator 48, thereby cooling the air. In FIG. 1, the long dashed short dashed arrow represents a flow of the liquid refrigerant, and the long dashed double-short dashed arrow represents a flow of the gas refrigerant.

The compressor 50 is arranged in an engine room (not shown) and is configured to suck and then compress the gas refrigerant, and discharge the refrigerant at a high pressure. The compressor 50 may be an electric compressor in which a fixed displacement type compression mechanism 50a whose discharge volume is fixed is driven by an electric motor 50b. The electric motor 50b is an AC motor whose rotational speed is controlled by an AC voltage output from an inverter 58 (refer to FIG. 2). The inverter 58 is controlled by the air-conditioning control device 24.

The condenser 52 is also arranged in the engine room, and is configured to carry out heat exchange between the refrigerant circulating inside and the exterior air delivered by a blower fan 60 serving as an exterior blower, thereby liquefying the compressed refrigerant through condensation. The blower fan 60 is an electric blower whose availability, namely, a rotational speed (air delivery amount) is controlled by a control voltage output from the air-conditioning control device 24.

The air/liquid separator 54 is configured to apply air/liquid separation to the refrigerant liquefied by the condensation, and cause only the liquid refrigerant to flow to the expansion valve 56. The expansion valve 56 is a decompressing device for decompressing the liquid refrigerant to expand the refrigerant, and is configured to supply the decompressed and expanded refrigerant to the evaporator 48.

A heating passage 62 and a cool air bypass passage 64 for causing the air having passed through the evaporator 48 to flow, and a mixing space 66 for mixing the air having passed those passages are formed on the downstream side of the airflow with respect to the evaporator 48 in the duct 12. A heater core 18 and a PTC heater 68 serving as a heating device for heating the air that has passed through the evaporator 48, in other words, the air that has been cooled by the evaporator 48 are arranged in this sequence along the direction of the flow of the air in the heating passage 62.

The heater core 18 is a heat exchanger for heating the air that has passed through the evaporator 48 through heat exchange between a coolant (hot coolant) of an engine EG for outputting a driving force for vehicle travel and the air that has passed through the evaporator 48. Specifically, a coolant flow passage for supply 70a and a coolant flow passage for return 70b connect the heater core 18 and the engine EG to each other. The electric water pump 72 and the water valve 22 are provided in the coolant flow passage for supply 70a. The coolant flow passages 70a and 70b, the electric water pump 72, and the water valve 22 cooperate with, for example, a coolant passage (not shown) in the engine EG, thereby forming the coolant circulation system 26 for circulating the coolant between the heater core 18 and the engine EG.

The electric water pump 72 is an electric water pump whose rotational speed (circulation flow amount of the coolant) is controlled by a control voltage output from the air-conditioning control device 24. The water valve 22 is an electromagnetic valve for normally maintaining an open state, and an opening amount is controlled by a control current output from the air-conditioning control device 24. When the opening amount of the water valve 22 is decreased, a flow amount of the coolant to the heater core 18 is thus decreased, and thermal energy supplied to the heater core 18 is decreased. When the water valve 22 is to be closed in the state where the electric water pump 72 is driven, the electric water pump 72 is stopped when the water valve 22 is closed.

Moreover, the PTC heater 68 includes a plurality of PTC devices (positive temperature coefficient thermistor devices), and is an electric heater for functioning as auxiliary heating means for generating heat as a result of supply of electric power to the PTC devices, thereby heating the air passing through the heater core 18. The air-conditioning control device 24 is configured to change the number of PTC devices to which the current is supplied through switching or the like, thereby controlling a heating performance of the entire PTC heater 68.

The cool air bypass passage 64 is an air passage configured to lead the air that has passed through the evaporator 48 to the mixing space 66 without passing through the heater core 18 and the PTC heater 68. Thus, the temperature of the air mixed in the mixing space 66 changes depending on the air amount ratio between the air passing through the heating passage 62 and the air passing through the cool air bypass passage 64.

The air mix damper 20 is provided on an inlet side of the heating passage 62 and the cool air bypass passage 64, and is configured to continuously change the air amount ratio between the cool air flowing into the heating passage 62 and the cool air flowing into the cool air bypass passage 64. The air mix damper 20 is driven by an electric actuator, which is not shown in FIG. 1A, and this electric actuator is controlled by a control signal output from the air-conditioning control device 24. The air mix damper 20 functions as a temperature adjustment device for adjusting the temperature (temperature of the delivered air supplied to the vehicle cabin 13) of the air in the mixing space 66.

The air outlet openings 42 to 44 are positioned at a most downstream portion of the airflow flowing through the duct 12, and are configured to blow out the delivered air whose temperature is adjusted from the mixing space 66 to the vehicle cabin 13, which is a space to be air-conditioned. The air outlet opening 42 is a face outlet opening for blowing out the air-conditioned air to an upper body of a passenger (not shown) in the vehicle cabin 13. The air outlet opening 43 is a foot outlet opening for blowing out the air-conditioned air to the feet of the passenger. The air outlet opening 44 is a defroster outlet opening for blowing out the air-conditioned air to an inner surface 76a of a front windshield 76.

A face door 42a for adjusting an opening area of the air outlet opening 42, a foot door 43a for adjusting an opening area of the air outlet opening 43, and a defroster door 44a for adjusting an opening area of the air outlet opening 44 are respectively arranged on an upstream side of the airflow with respect to the air outlet openings 42 to 44. The face door 42a, the foot door 43a, and the defroster door 44a are coupled to an electric actuator 78 for door drive via a link mechanism (not shown), and are driven pivotally in cooperation with one another. The electric actuator 78 is also controlled by a control signal output from the air-conditioning control device 24. The air outlet openings 42 to 44 and the electric actuator 78 function as outlet opening adjustment devices for respectively adjusting the opening areas of the respective air outlet openings 42 to 44.

Various outlet opening modes can be set through settings of the air outlet openings 42 to 44. The outlet opening modes available for the setting include a face mode (FACE), bi-level mode (B/L), a foot mode (FOOT), a defroster mode (DEF), and a foot/defroster mode (F/D).

The face mode is a mode for fully opening the face outlet opening 42, thereby blowing out the air from the face outlet opening 42 toward the upper body of the passenger in the vehicle cabin 13. The bi-level mode is a mode for opening both of the face outlet opening 42 and the foot outlet opening 43, thereby blowing out the air toward the upper body and the feet of the passenger in the vehicle cabin 13. The foot mode is a mode for fully opening the foot outlet opening 43, and opening the defroster outlet opening 44 at a small opening degree, thereby blowing out the air mainly from the foot outlet opening 43. The defroster mode is a mode for fully opening the defroster outlet opening 44, thereby blowing out the air from the defroster outlet opening 44. The foot/defroster mode is a mode for opening the foot outlet opening 43 and the defroster outlet opening 44 at approximately the same opening degree, thereby blowing out the air from both of the foot outlet opening 43 and the defroster opening 44.

Figure 1B:
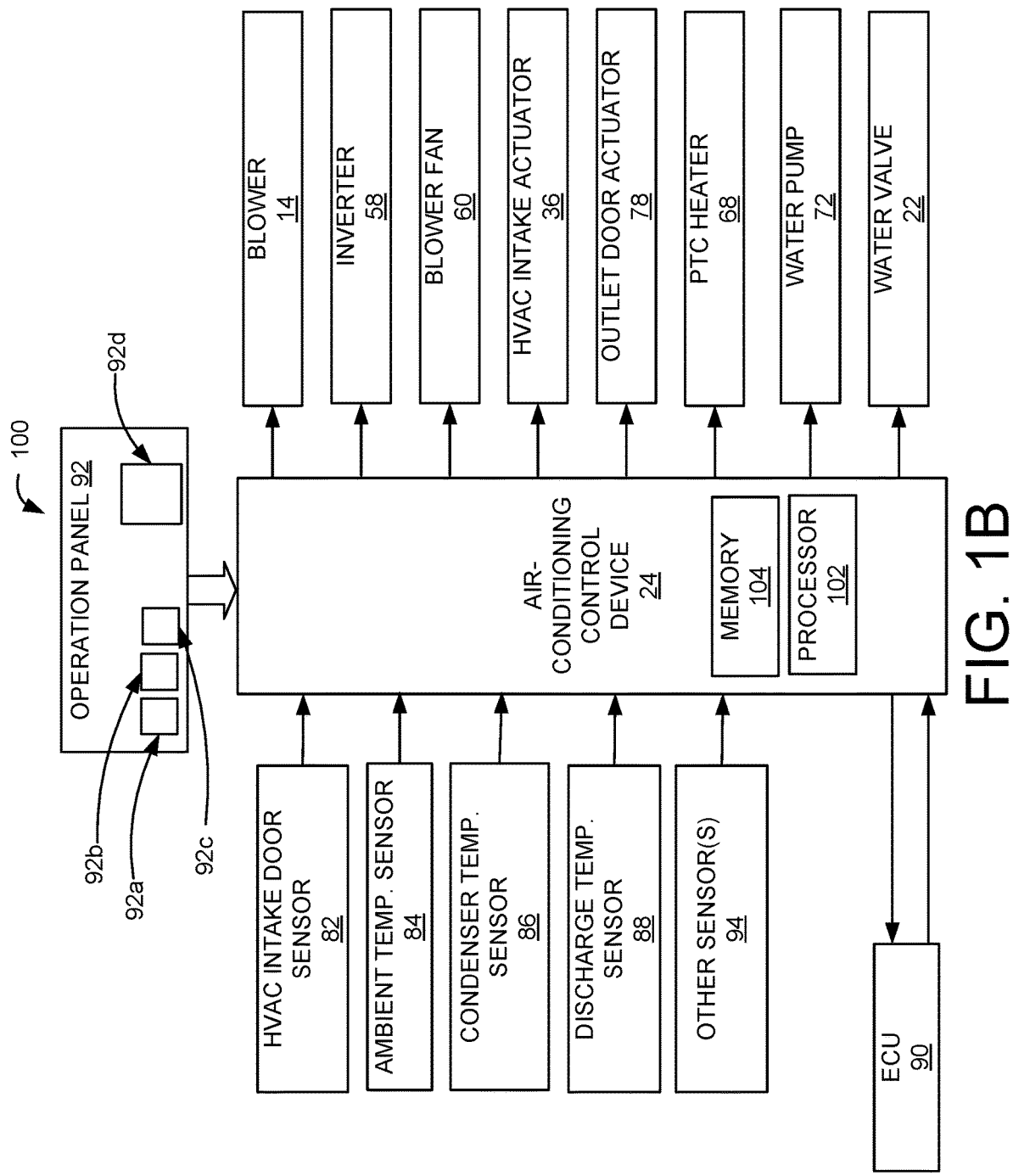
FIG. 1B illustrates an air-conditioning system control device configuration in accordance with embodiments of the technology disclosed herein.

With reference to FIG. 1B, a description is now given of a control system according to the embodiment. In various embodiments, the air-conditioning control device 24 is constructed by a widely known microcomputer including a CPU, a ROM, and a RAM, and a peripheral circuit thereof, and is configured to carry out various types of calculation and processing based on an air-conditioning program stored in the ROM described later, thereby controlling operations of various devices connected to an output side. In some embodiments, the air-conditioning control device 24 includes a processor 102 and a memory 104. The processor 102 and memory 104 may be similar to the processor and memory discussed with respect to FIG. 4 discussed in more detail below.

As illustrated in FIG. 1B, the blower 14, the inverter 58 for the electric motor 50b of the compressor 50, the blower fan 60 as an exterior fan, the electric actuator 36 for the HVAC intake door 34, the electric actuator 78 for the doors (outlet opening doors) 42a, 43a, and 44a for switching the outlet opening mode, the PTC heater 68, the electric water pump 72, the water valve 22, and the like are connected to the output side of the air-conditioning control device 24.

In various embodiments, the air-conditioning control device 24 can have a variety of sensors connected to the input side of the air-conditioning control device 24. HVAC intake door sensor 82, ambient temperature sensor 84, and condenser temperature sensor 86 are connected to the input side of the air-conditioning control device 24. In various embodiments, other sensors 88 may also be connected to the air-conditioning control device 24 to enable the air-conditioning control device to perform other functions (e.g., controlling PTC heater 68). HVAC intake door sensor 82 is configured to inform the air-conditioning control device 24 of the inlet opening mode of the HVAC intake door 34. Based on the position of the HVAC intake door 34 detected by the HVAC intake door sensor 82, the air-conditioning control device 24 and/or the ECU 90 can determine whether the vehicle is in recirculate, fresh, or air-mix mode. In various embodiments, the HVAC intake door sensor 82 may be an optical sensor configured to detect the position of the HVAC intake door 34. In other embodiments, the HVAC intake door sensor 82 can be mounted on the HVAC intake door 34 and include a gyroscope or other positional detector. These examples are provided for illustration and should not be interpreted to limit the scope of the subject matter of the present disclosure. In some embodiments, the position of the HVAC intake door 34 may be determined based on a setting entered by a passenger within the vehicle.

Ambient temperature sensor 84 is connected to the input side of the air-conditioning control device 24. The ambient temperature sensor 84 is configured to inform the air-conditioning control device 24 the temperature of the air outside the vehicle. In various embodiments, the ambient temperature sensor 84 is located in or near the front grill of a vehicle, a front bumper of the vehicle, or a combination thereof. In some embodiments, the ambient temperature sensor 84 may be a resistance temperature sensor (RTD), which is a sensor that indicates changes in temperatures by reducing or decreasing the resistance of the circuit. Another non-limiting example of the ambient temperature sensor 84 is a negative temperature coefficient (NTC) sensor configured such that the NTC sensor's resistance decreases as the temperature of the outside air increases. In other embodiments, the ambient temperature sensor 84 may be a positive temperature coefficient (PTC) sensor configured such that the PTC's resistance increases, rather than decreases, when the temperature increases. In other embodiments, other passive temperature sensors may be used, such as thermocouples. In various embodiments, the ambient temperature sensor 84 may comprises one of more of the non-limiting examples.

One or more ambient temperature sensors 82 may be used in some embodiments, each ambient temperature sensor 82 connected to the input side of the air-conditioning control device 24 as illustrated in FIG. 1B. When multiple ambient temperature sensors 82 are utilized, the air-conditioning control device 24 and/or the ECU 90 can include non-transitory machine-readable code embodying control logic for determining the ambient air temperature based on the multiple readings. In some embodiments, this control logic can comprise taking an average of the temperature readings from the multiple temperature readings provided by the ambient temperature sensors 82.

As illustrated in FIG. 1B, a condenser temperature sensor 86 is also connected to the input side of the air-conditioning control device 24. As discussed above, the use of ambient temperature alone fails to account for scenarios where the load on the compressor 50 is already heavy. Measuring the temperature on the intake side of the condenser 52 (i.e., the input from the compressor 50) allows for consideration of the load on the compressor 50 in determining which mode the HVAC intake box 28 should be set. Where the temperature of the gas at the condenser 52 intake is high, this indicates a heavy load on the compressor 50. A heavy load on the compressor 50 increases the overall load on the engine, reducing fuel economy. As explained in greater detail below, the condenser temperature sensor 52 enables a more granular determination as to whether to switch the HVAC intake mode from recirculate to fresh. In various embodiments, the condenser temperature sensor 86 can be any of the types of sensors discussed with respect to the ambient temperature sensor 84.

In various embodiments, a discharge temperature sensor 88 is connected to the input side of the air-conditioning control device 24. The discharge temperature sensor 88 is configured to detect the discharge coolant temperature of the compressor 50. In various embodiments, the temperature detected by the discharge temperature sensor 88 may be used to determine the amount of load on the compressor, while in others the temperature detected by the discharge temperature sensor 88 can be used in conjunction with the temperature detected by the condenser temperature sensor 86. The discharge temperature sensor 88 can be any of the types of sensors discussed with respect to the ambient temperature sensor 84 and condenser temperature sensor 86.

In various embodiments, one or more other sensors 94 may be connected to the input side of the air-conditioning control device 24. The other sensors 94 can provide additional information to the air-conditioning control device 24 to perform other functions, such as controlling the PTC heater.

Further, operation signals are input from various air-conditioning operation switches provided on an operation panel 92 arranged near an instrument panel (not shown) at a front portion of the vehicle cabin 13 to the input side of the air-conditioning control device 24, and the various air-conditioning operation switches are operated by the passenger. Non-limiting examples of the various air conditioning switches include: an on/off switch 92*a* for controlling the air-conditioner (specifically, turning on/off the compressor 50); an auto switch 92*b* used to set or reset automatic control for the air-conditioning device 10; an inlet opening mode switch 92*c* for switching the inlet opening mode; an outlet opening mode switch (not shown) for switching the outlet opening mode; an air amount setting switch (not shown) for the blower 14; a vehicle cabin temperature setting switch (not shown) for setting a target temperature Tset in the vehicle cabin 13; and the like are provided on the operation panel 88.

As illustrated in FIG. 1B, a display part 92*d* for displaying the operation state of the air-conditioning device 10 is provided on the operation panel 92. The inlet opening mode selected by the inlet opening mode switch 92*c* and the like are displayed on the display part 92*d*.

Further, as shown in FIG. 1B, the air-conditioning control device 24 is electrically connected to an ECU 90 for communication, which is an engine computer for controlling the operation of the engine EG, and the air-conditioning control device 24 and the ECU 90 are configured to transmit/receive required information to/from each other. Although illustrated as separate components, in some embodiments the air-conditioning control device 24 and the ECU 90 may be combined. Thus, based on a detection signal or an operation signal input to one of the control devices, another control device can control operations of various devices connected to an output side thereof.

For example, when the ECU 90 determines that a decrease in a circulatory supply amount of the coolant to the heater core 18 or stop of the coolant is necessary, a signal for requiring the decrease in the opening amount of the water valve 22 or the closure of the water valve 22 is input from the engine control device 90 to the air-conditioning control device 24. When the air-conditioning control device 24 receives the signal for requiring the decrease in the opening amount of the water valve 22, the air-conditioning control device 24 decreases the opening amount of the water valve 22. When the air-conditioning control device 24 receives the signal for requiring the closure of the water valve 22, the air-conditioning control device 24 closes the water valve 22. Moreover, the air-conditioning control device 24 can change the operation of the engine EG by outputting a signal for requiring the operation of the engine EG to the ECU 90. Further, when the engine EG is operating for the air-conditioning, the air-conditioning control device 24 can stop the engine EG depending on necessity by avoiding outputting the signal for requiring the operation of the engine EG.

Figure 2A:
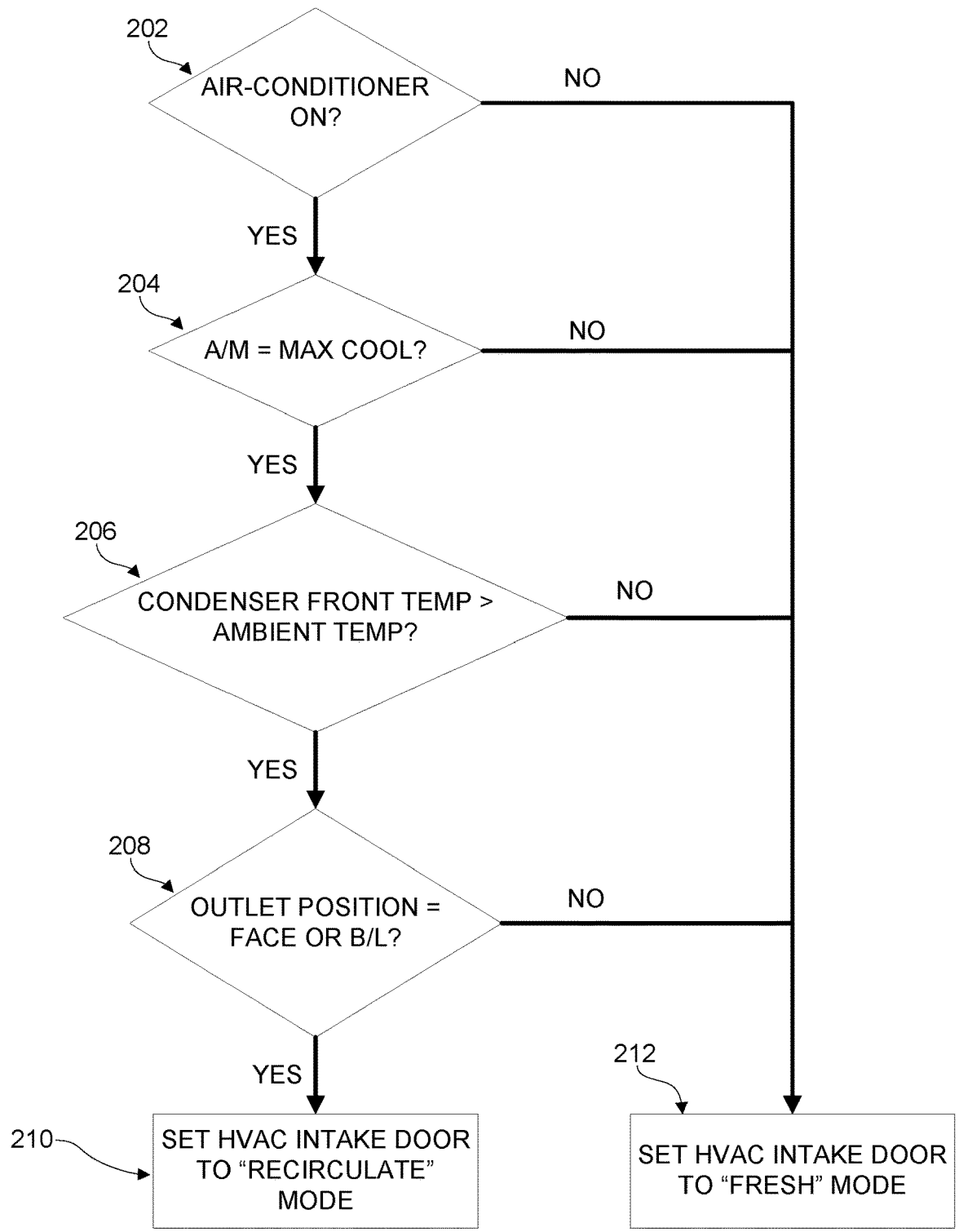
FIG. 2A illustrates an example flow of the control logic in accordance with embodiments of the technology disclosed herein.

FIG. 2A is a flow diagram illustrating an example flow 200 of the control logic in accordance with embodiments of the present disclosure. The operations shown in FIG. 2A can be embodied in non-transitory machine-readable code that can be executed by the ECU 90 or the processor 102 discussed with respect to FIG. 1B. At operation 202, a determination is made as to whether the air-conditioner is on. If the air-conditioner is not on, at operation 212 the HVAC intake door is set to "FRESH" mode, positioned such that ambient air is taken in through the exterior air opening 32, and the interior air opening 30 is sealed off. When the air-conditioner is not activated there is no pre-treated interior air to recirculate to reduce the load on the compressor 50.

In various embodiments, operation 212 can comprise one or more steps. A non-limiting example of operations 212 can include is determining the current position of the HVAC intake door 34 and, if the HVAC intake door 34 is not in FRESH mode activating the HVAC intake motor actuator 36 to place the HVAC intake door 34 in the proper position.

In various embodiments, if the air-conditioner is found to be on at operation 202, whether the air mix (A/M) position is set to "MAX COOL" is determined at operation 204. The MAX COOL mode of the air-condition can present a heavy load for the compressor 50, as the temperature within the cabin must remain very cold. In situations where the ambient temperature is low but the vehicle has just been though some aggressive driving conditions (e.g., off-roading, towing, etc.), the compressor 50 may already be strained, especially when the passenger wants MAX COOL in the cabin 13. If the A/M position is not MAX COOL, the HVAC intake door is set to FRESH mode at operation 212.

At operation 206, if it is determined that the A/M position is set to MAX COOL, the temperature at the front of the condenser is compared against the ambient temperature. If the ambient temperature is greater than the condenser front temperature then the HVAC intake door can be set to FRESH mode such that the ambient air can flow into the air-conditioning system 10 at operation 212. When the ambient temperature exceeds the condenser front temperature it indicates that the compressor 50 load is not excessive and utilizing the exterior ambient air would not unduly burden the air-conditioning system such that it would detrimentally impact fuel economy.

However, where the condenser front temperature exceeds the ambient temperature that indicates that the load on the compressor is large and using the ambient air will further burden the compressor. In such cases, using recirculated air that has already been treated can help reduce the load on the compressor because less effort is required to cool the previously-cooled interior air. This helps to improve fuel economy compared to the prior solutions that determined the HVAC intake position only on the ambient temperature because the overall load on the compressor is reduced, thereby reducing the impact of the compressor operation on the overall load of the engine.

In various embodiments, when the condenser front temperature is greater than the ambient temperature the positioning of the air outlet openings into the vehicle cabin can be identified. Where the air outlet openings are not in the face mode (FACE) or bi-level mode (B/L), the HVAC intake door can be set to FRESH mode at operation 212. However, where the air outlet openings are determined to be in the face mode (FACE) or bi-level mode (B/L), the HVAC intake door can be set to the RECIRCULATE mode at operation 210. In various embodiments, setting the HVAC intake door to RECIRCULATE at operation 210 can be performed by activating the HVAC intake door actuator, similar to (but opposite of) operation 212.

By switching to recirculated air in such situations the technology of the present disclosure allows for reduced air-conditioning load on the engine in a variety of ways. In various embodiments, switching to RECIRCULATE mode allows for the compressor to be cycled on and off more often than if ambient air at a higher temperature was used in the cooling process. Because the A/M position is set to MAX COOL, the air-conditioning control device and/or the ECU can assume that the ambient air temperature outside is higher than the interior air temperature of the cabin. By using the recirculated cabin air the compressor will not need to work as hard, allowing in various embodiments for the compressor to be turned off more frequently, reducing the load of the compressor on the engine.

In various embodiments, where a variable compressor is implemented, switching to RECIRCULATE mode allows for the displacement of the compressor to be changed to reduce the load on the compressor. Variable compressors provide fuel economy benefits over traditional fixed compressors. However, using the traditional approach, which only takes into account the ambient air temperature, still fails to account for situations where the ambient temperature is lower than the temperature at the condenser front load. By utilizing embodiments of the present disclosure, the variation in compressor displacement can be optimized to obtain even greater fuel efficiency benefits using a variable compressor.

In various embodiments, using the RECIRCULATE mode can lower the duty on the blower fan. The blower fan ensures that ambient air moves across the condenser coils to perform the heat transfer required to condense the high pressure, high temperature gas from the compressor for generating the cold liquid sent to the evaporator from the condenser. By using the recirculated air instead of ambient air, the duty on the blower fan can be reduced because, as the compressor load diminishes, the temperature of the gas entering the condenser diminishes, reducing the amount of work necessary for the heat transfer operation to be effective. In such cases, the blower fan will not need to run at such a high speed and/or as often. This reduces the impact of the blower fan on the overall load of the engine, which also impacts fuel economy. Moreover, reducing the duty on the blower fan also reduces the blower fan noise, improving the experience for passengers.

In various embodiments, using embodiments of the technology disclosed herein enable smaller blower fans to be used in the air-conditioning system. By controlling the load on the compressor in a more granular manner than previous solutions, the overall amount of work a blower fan needs to perform is reduced. This enables a small fan to be capable of providing the same performance as a larger fan using the traditional ambient temperature-based approach. A smaller blower fan results in more space in the engine compartment of the vehicle, reducing the overall size of the air-conditioning unit. Moreover, reducing the blower fan size improves the performance of the vehicle in a front crash situation by reducing the amount of material may be pushed into the engine and/or the passenger cabin.

Figure 2B:
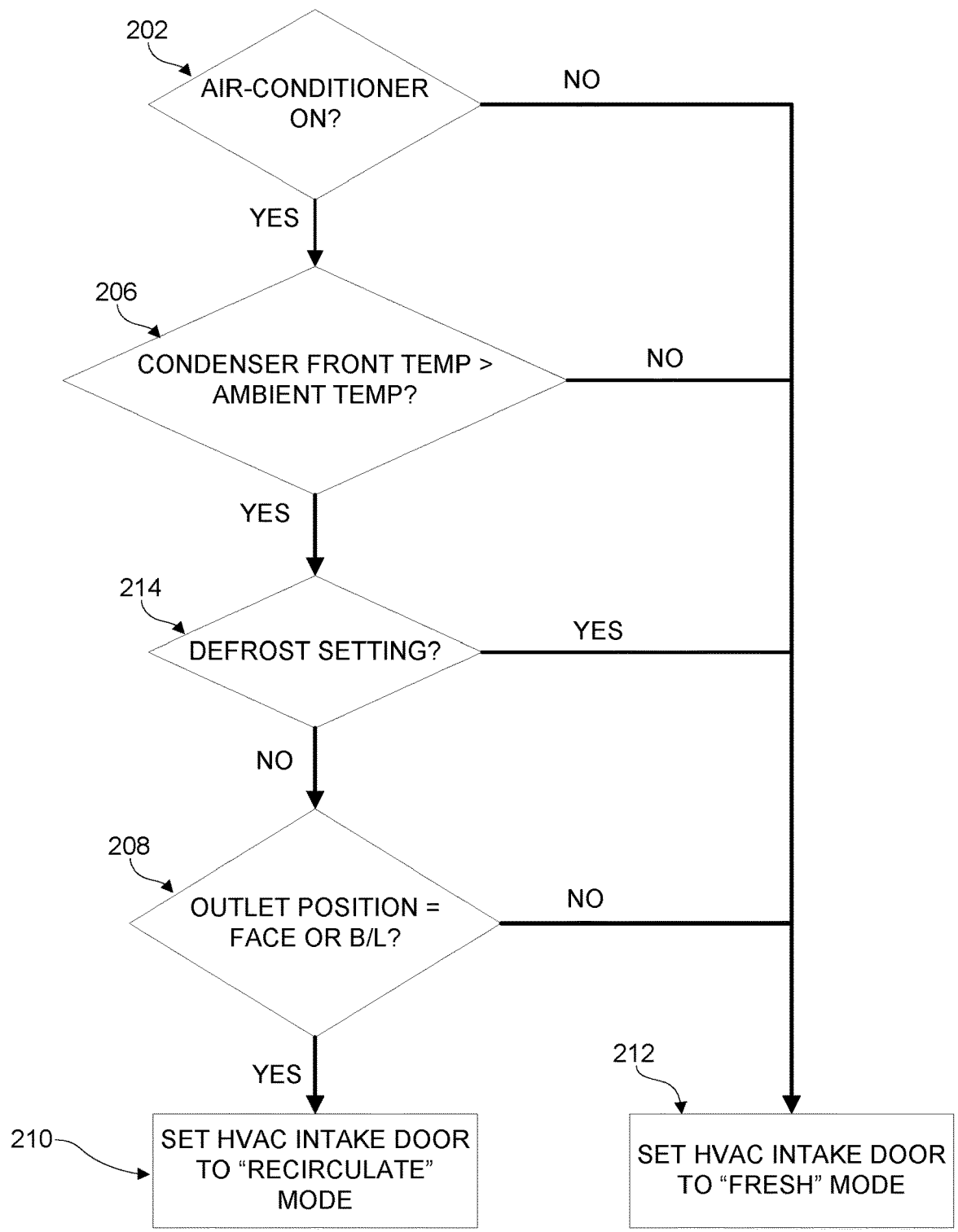
FIG. 2B illustrates another example flow of the control logic in accordance with embodiments of the technology disclosed herein.

FIG. 2B illustrates another example flow 200b in accordance with embodiments of the technology disclosed herein. As illustrated, the flow 200b is similar to flow 200a, with like-referenced operations being the same as those discussed above with respect to FIG. 2A. However, after determining whether the condenser temperature is greater than the ambient temperature at operation 206, flow 200b than determines whether a defrost setting is engaged at operation 214. For safety reasons, dry air is required for the defrosting process, which would indicate the need for the HVAC intake door to be set in a FRESH mode. In various embodiments, a defrost mode may include a defrost setting or a defogging setting. If the defrost setting is engaged, than the HVAC intake door is set to FRESH mode to allow the drier ambient air to enter the air-conditioning system. If the no defrost setting is engaged, than the flow 200b can continue to determine whether to set the HVAC intake door to the RECIRCULATE mode.

The flows 200a and 200b are examples, and a person of ordinary skill in the art would understand that the flows 200a and 200b may be modified and still provide the benefits discussed above. As a non-limiting example, in some embodiments the flows 200a and 200b may determine whether the vehicle is in a particular driving mode (e.g., tow mode). Where the vehicle is in a driving mode such as tow mode the potential for the ambient air temperature to be lower than the condenser front temperature can increase due to the heavier workload of the engine. The harder the engine is working, the warmer the air around the condenser front can be due to the heat generated by the engine, reducing the effectiveness of the heat transfer. This requires an increased load on the compressor to increase the heat (and pressure) of the refrigerant flowing into the condenser for effective heat transfer.

Figure 3:
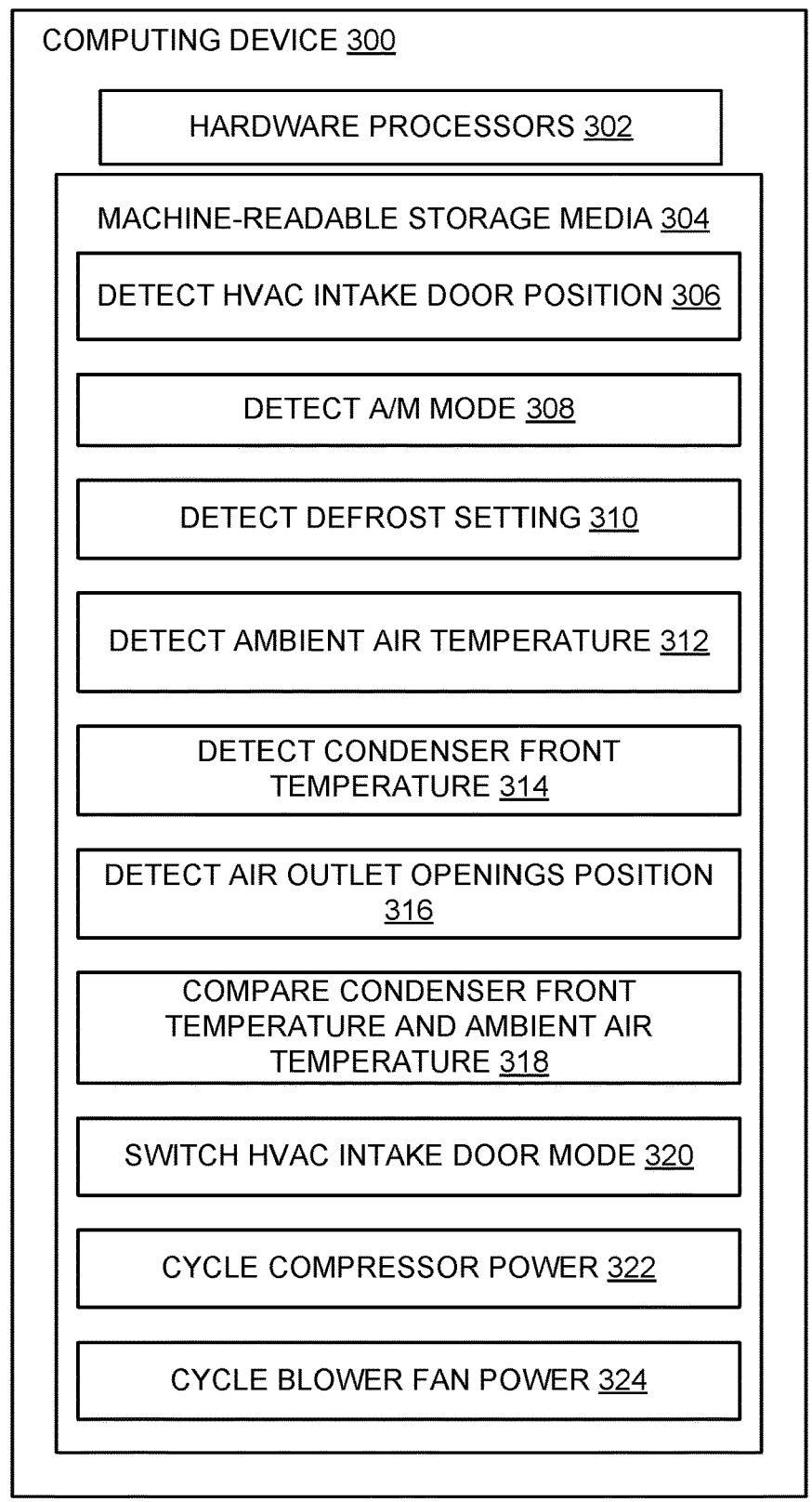
FIG. 3 illustrates an example computing device in accordance with embodiments of the technology disclosed herein.

FIG. 3 shows an example computing device 300 in accordance with embodiments of the present disclosure. In various embodiments, the computing device 300 may be similar to air-conditioning control device 24 and/or the ECU 90 discussed with respect to FIG. 1B. Where operations and functionality of computing device 300 are similar to those discussed with respect to FIGS. 1A-3, the description of those operations and functionality should be interpreted to apply. Computing device 300 includes hardware processors 302. In various embodiments, hardware processors 302 may be similar to the processors discussed above with respect to FIG. 1B. In various embodiments, hardware processors 302 may include one or more processors Hardware processors 302 are configured to execute instructions stored on a non-transitory machine-readable medium 304. Machine readable medium 304 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 304 may include various sub-instructions for performing the function embodied by the identified functions. For example, the instruction "Detect HVAC Intake Door Position" 306 may include various sub-instructions for determining the position of the HVAC intake door, as discussed with respect to FIGS. 1A-1B. The instruction "Detect A/M Mode" 308 may include various sub-instructions for determining the air mix position mode of the vehicle, as discussed with respect to FIGS. 1A, 1B, and 2A. The instruction "Detect Defrost Setting" 310 may include sub-instructions to determine whether a defrost setting of the vehicle is engaged, as discussed with respect to FIG. 2B. In various embodiments, the sub-instructions may include instructions for determining whether a defrost setting is selected for a front windshield, side windows, or the rear window, and/or if a defogging setting has been engaged.

The instruction "Detect Ambient Air Temperature" 312 may include sub-instructions to detect the ambient temperature, as discussed with respect to FIGS. 1A-1B and 2A-2B. In various embodiments, the sub-instructions can include instructions for receiving readings from one or more ambient temperature sensors positioned around the vehicle and determining an ambient temperature based on the one or more readings. Where multiple readings are received, the sub-instructions may include instructions for taking an average of the multiple readings and using that as the ambient temperature. In various embodiments, the highest and lowest readings may be discarded and the average of the remaining readings may be used as the ambient temperature.

The instruction "Detect Condenser Front Temperature" 314 may include sub-instructions to detect the temperature at the front of the condenser, as discussed with respect to FIGS. 1A-1B and 2A-2B. The instruction "Detect Air Outlet Openings Position" 316 may include sub-instructions for detecting the selected mode of the air outlet openings in the cabin, as discussed with respect to FIGS. 1A-1B and 2A-2B. The instruction "Compare Condenser Front Temperature and Ambient Air Temperature" 318 may include sub-instructions for determining which temperature is higher, as discussed with respect to FIGS. 1A-1B and 2A-2B.

The instruction "Switch HVAC Intake Door Mode" 320 may include sub-instructions for setting the position of the HVAC intake door based on the comparison of the condenser front temperature and the ambient temperature, as discussed with respect to FIGS. 1A-1B and 2A-2B. In various embodiments, the sub-instructions can include instructions for activating and controlling a HVAC intake door actuator as discussed with respect to FIGS. 1A and 1B.

Figure 4:
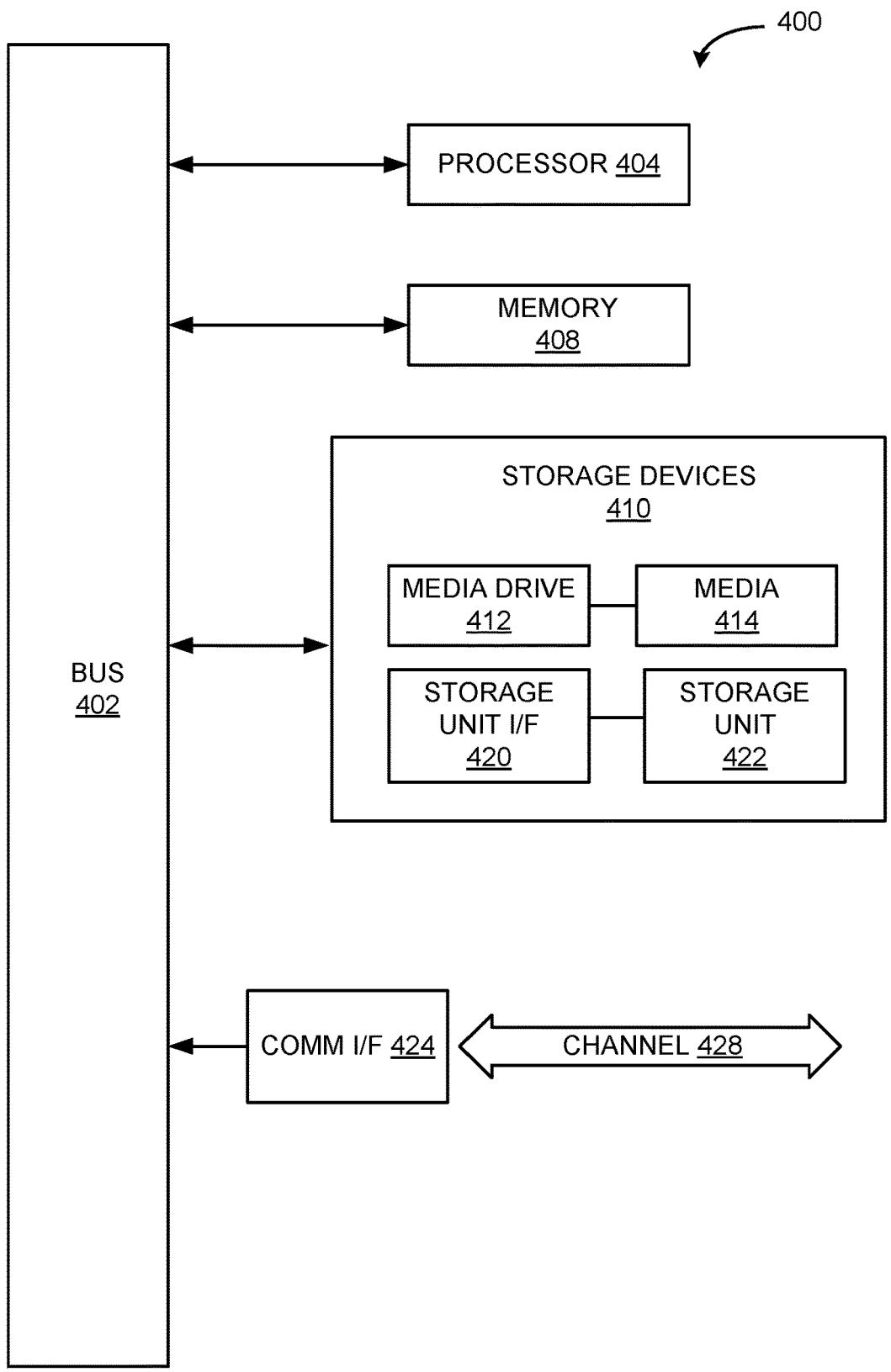
FIG. 4 is an example computing system in which embodiments described in the present disclosure may be implemented.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 400 might include, for example, one or more processors, controllers, control components, or other processing devices. The processor 102 or the processor of the ECU 90 discussed with respect to FIGS. 1A-1B may be implemented as processor 404. Processor 404 might be implemented using a general-purpose or special-purpose processing engine such as, for example, a microprocessor, controller, or other control logic. Processor 404 may be connected to a bus 402. However, any communication medium can be used to facilitate interaction with other components of computing component 400 or to communicate externally.

Computing component 400 might also include one or more memory components, simply referred to herein as main memory 408. For example, random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid-state drive, a magnetic tape drive, an optical drive, a compact disc (CD) or digital video disc (DVD) drive (R or RW), or other removable or fixed media drive might be provided. Storage media 414 might include, for example, a hard disk, an integrated circuit assembly, magnetic tape, cartridge, optical disk, a CD or DVD. Storage media 414 may be any other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot. Other examples may include a PCMCIA slot and card, and other fixed or removable storage units 422 and interfaces 420 that allow software and data to be transferred from storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 424. These signals might be provided to communications interface 424 via a channel 428. Channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 408, storage unit 420, media 141, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

In common usage, the term "or" can have an inclusive sense or exclusive sense. As used herein, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusive" and "A or B but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for controlling a heating, ventilation, and air-conditioning (HVAC) intake, comprising:
   detecting, by an ambient temperature sensor, a temperature of ambient air;
   detecting, by a condenser front temperature sensor, a temperature of air at a front of a condenser;
   receiving, at an input side of an air-conditioning control device, the detected temperature of ambient air and the detected temperature of air at the front of the condenser;
   comparing, by a processor of the air-conditioning control device, the detected temperature of ambient air and the detected temperature of air at the front of the condenser; and
   in response to determining the detected temperature of air at the front of the condenser is higher than the detected temperature of ambient air, setting, by the processor of the air-conditioning control device, an HVAC intake door into a recirculate position;
   wherein the recirculate position is configured to allow air from a passenger compartment of a vehicle to enter the HVAC intake.

2. The method of claim 1, further comprising determining, by the processor of the air-conditioning control device, if an air mix (A/M) position is set to a maximum cooling (MAX COOL) mode.

3. The method of claim 1, further comprising determining, by the processor of the air-conditioning control device, if a defrost setting is engaged.

4. The method of claim 3, wherein the defrost setting comprises a defrost mode, a defogging mode, or a combination of both.

5. The method of claim 3, wherein the defrost setting comprises a defrost setting for one or more of: a front windshield; one or more side windows; or a rear window.

6. The method of claim 3, further comprising in response to determining the defrost setting is engaged, setting, by the processor of the air-conditioning control device, an HVAC intake door into a fresh air position configured to enable ambient air to enter the HVAC intake.

7. The method of claim 1, wherein setting the HVAC intake door into the recirculate position comprises activating, by the processor of the air-conditioning control device 24, a HVAC intake door actuator configured to seal an exterior air inlet and leave open an interior air inlet.

8. The method of claim 1, wherein the air-conditioning control device is part of an engine control unit (ECU) of the vehicle.

9. The method of claim 1, further comprising detecting, by the processor of the air-conditioning control device, a mode of one or more outlet air openings into the compartment of the vehicle.

10. The method of claim 9, wherein the mode of the one or more outlet air openings may comprise one of: a face mode; a bi-level mode, a foot mode.

11. The method of claim 10, further comprising in response to determining the detected temperature of air at the front of the condenser is higher than the detected temperature of ambient air and the mode of the one or more outlet air openings is set to a face mode or a bi-level mode, setting, by the processor of the air-conditioning control device, an HVAC intake door into a recirculate position.

12. A system, comprising:
   an ambient temperature sensor configured to detect a temperature of ambient air exterior to a vehicle;
   a condenser front temperature sensor configured to detect a temperature of air around a front of a condenser;
   an air-conditioning system comprising:
      a condenser; and
      a heating, ventilation, and air-conditioning (HVAC) intake; and
   an air-conditioning control device, the air-conditioning control device including a processor configured to execute non-transitory machine-readable instructions to cause the processor to:
      receive the detected temperature of ambient air and the detected temperature of air at the front of the condenser;
      compare the detected temperature of ambient air and the detected temperature of air at the front of the condenser; and
      in response to determining the detected temperature of air at the front of the condenser is higher than the detected temperature of ambient air, set an HVAC intake door into a recirculate position;
      wherein the recirculate position is configured to allow air from a passenger compartment of the vehicle to enter the HVAC intake.

13. The system of claim 12, wherein the ambient temperature sensor comprises one or more of: a resistance temperature sensor (RTD); a negative temperature coefficient (NTC) sensor; a positive temperature coefficient (PTC) sensor; a thermocouple.

14. The system of claim 12, wherein the condenser front temperature sensor comprises one or more of: a resistance temperature sensor (RTD); a negative temperature coefficient (NTC) sensor; a positive temperature coefficient (PTC) sensor; a thermocouple.

15. The system of claim 12, wherein the air-conditioning system further comprises an HVAC intake door actuator, and the processor is further configured to execute non-transitory machine-readable instructions to cause the processor to set the HVAC intake door into a recirculate position by activating the HVAC intake door actuator to seal an exterior air inlet of the HVAC intake and leave open an interior air inlet of the HVAC intake.

16. The system of claim 12, wherein the air-conditioning control device is part of an engine control unit (ECU) of the vehicle.

17. The system of claim 12, wherein the processor is further configured to execute non-transitory machine-readable instructions to cause the processor to:
    detect a mode of one or more outlet air openings into a compartment of the vehicle; and
    in response to determining the detected temperature of air at the front of the condenser is higher than the detected temperature of ambient air and the mode of the one or more outlet air openings is set to a face mode or a bi-level mode, set an HVAC intake door into a recirculate position.

18. The system of claim 12, wherein the processor is further configured to execute non-transitory machine-readable instructions to cause the processor to:
    determine if a defrost setting is engaged; and
    in response to determining the defrost setting is engaged, set the HVAC intake door into a fresh air position configured to enable ambient air to enter the HVAC intake, the fresh air position comprising positioning the HVAC intake door to seal an interior air inlet of the HVAC intake and leave open an exterior air inlet of the HVAC intake.

19. The system of claim 12, wherein the processor is further configured to execute non-transitory machine-readable instructions to cause the processor to:
    determine if an air mix (A/M) position is set to a maximum cooling (MAX COOL) mode; and
    in response to determining the detected temperature of air at the front of the condenser is higher than the detected temperature of ambient air and the A/M position is set to the MAX COOL mode, set an HVAC intake door into a recirculate position.

20. A non-transitory machine-readable medium storing instructions which, when executed by a processor of an air-conditioning control device, cause the processor to:
    receive an ambient air temperature reading from an ambient air temperature sensor and a condenser front air temperature reading from a condenser front temperature sensor;
    compare the received ambient air temperature and the received condenser front air temperature; and
    in response to determining the detected temperature of air at the front of the condenser is higher than the detected temperature of ambient air, set an HVAC intake door into a recirculate position.

* * * * *